July 5, 1966 S. R. LEDERHANDLER ETAL 3,259,865

DEWAR FOR CRYOGENIC COOLING OF SOLID STATE DEVICE

Filed Jan. 5, 1964 2 Sheets-Sheet 1

INVENTORS
SAUL R. LEDERHANDLER
ROY DURNWIRTH

BY Hubbell, Cohen & Stiefel

ATTORNEYS.

DEWAR FOR CRYOGENIC COOLING OF SOLID STATE DEVICE

Filed Jan. 5 1964 2 Sheets-Sheet 2

INVENTORS
SAUL R. LEDERHANDLER
ROY DURNWIRTH
BY Hubbell, Cohen & Stiefel
ATTORNEYS.

United States Patent Office
3,259,865
Patented July 5, 1966

3,259,865
DEWAR FOR CRYOGENIC COOLING OF SOLID STATE DEVICE

Saul R. Lederhandler and Roy Durnwirth, Somerville, N.J., assignors, by mesne assignments, to The Micro State Electronics Corporation, Murray Hill, N.J., a corporation of Delaware
Filed Jan. 6, 1964, Ser. No. 335,865
13 Claims. (Cl. 338—18)

This invention relates to Dewars and particularly to Dewars for cooling solid state devices to cryogenic temperatures.

In innumerable applications for solid state devices, it is desirable and often necessary to maintain the device at cryogenic temperatures. For example, when solid state infrared detectors are employed, the operation of the device is markedly improved when cooled to cryogenic temperatures. While the attainment of such temperatures for solid state devices is relatively easy in a laboratory, when the device is to be employed in the field, in some portable apparatus for example, the problem of cooling the device is quite difficult.

The most satisfactory solution of this problem to date has been the use of small evacuated Dewars. Such Dewars generally comprise a double walled glass envelope, with the space therebetween evacuated. Electrical means running to and from the device within the Dewar are permitted to pass out through the ends of the double walls by leads that are hermetically sealed to the glass envelope. While such Dewars perform the function of cryogenic cooling satisfactorily, being made of glass, they are fragile and hence have only limited application. Moreover, it is difficult to hold glass Dewars to close dimensional tolerances, especially under commercial production conditions. An absence of tolerance can lead to malfunction of the solid state device. To obtain close tolerances in glass Dewars usually necessitates very costly grinding operations which add substantially to the overall cost of the prior art device.

It is therefore one object of the present invention to provide a new and improved Dewar of extremely rugged construction but suitable for maintaining solid state devices at cryogenic temperatures.

Another object of the present invention is the provision of a new and improved Dewar constructed from metal and ceramic materials to yield a rugged construction which is effective for maintaining solid state devices at cryogenic temperatures.

A further object of the present invention is the provision of a new and improved Dewar having means for supporting a solid state device which is separate from the main construction of the Dewar but joinable thereto whereby to facilitate the processing and testing of the device prior to its incorporation into the Dewar.

The above and other objects, characteristics and features of the present invention will be more fully understood from the following description taken in connection with the accompanying illustrative drawings.

Figures 1, 2, 3, 4:
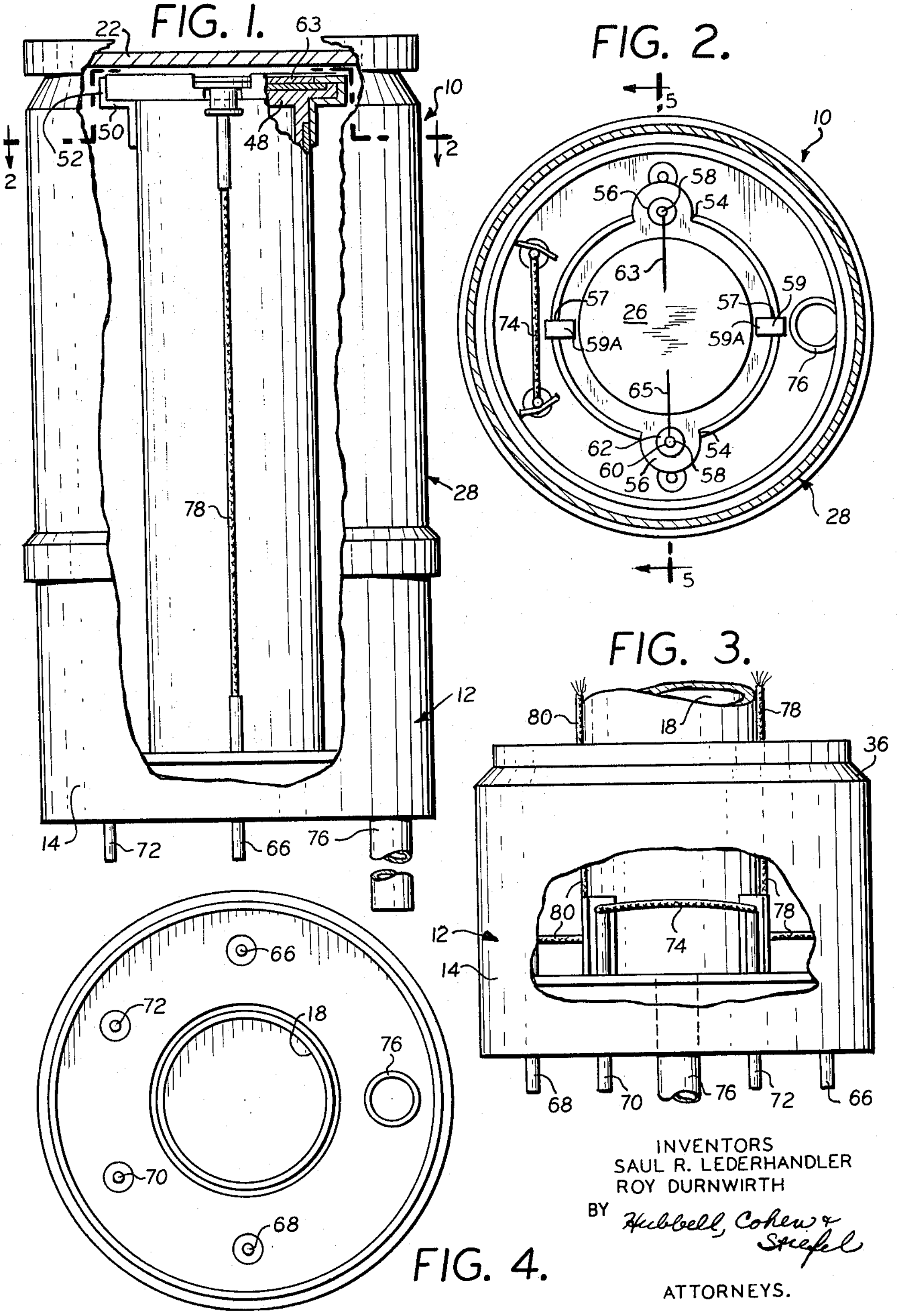
FIG. 1 is a side elevational view of a Dewar embodying the present invention, with portions of the outer and inner walls thereof broken away to show certain details of construction.
FIG. 2 is a sectional view taken along the line 2—2 in FIG. 1.
FIG. 3 is a fragmentary side elevational view of the Dewar with portions of the outer wall broken away to show certain details of construction.
FIG. 4 is a bottom view of the Dewar.

Referring now to the drawings in detail, and particularly to FIGS. 1 through 6 thereof, the Dewar is generally designated by the reference numeral 10. The Dewar 10 comprises a base 12 having an outstanding sleeve 14 which extends a short way upward from the bottom of the Dewar, a ceramic wafer or disc 16 disposed within the bottom of the sleeve 14 and an inner sleeve 18 extending upwardly from the disc 16 to near the top of the Dewar. Fixed to the upper end of the sleeve 14 is an outer sleeve 20 which at its top supports a window 22. Underlying the window 22 and supported by a cap 23 sealing the upper end of the inner sleeve 18, is a header 24 on which is a solid state device 26 that may be of any suitable type such as, for example, an infrared detector, a laser, or any other similar device which requires cryogenic cooling.

As will be recognized by those skilled in the art, a cryogenically cooled liquid such as liquid nitrogen or liquid helium is disposed within the inner sleeve 18 and is contained by the inner sleeve and cap 23. The major function of the Dewar is to contain the cooled liquid and to resist the transmission of heat to said liquid to cause it to boil off, whether said heat is transmitted by radiation, convection or conduction. Thus the Dewar includes a number of desirable features designed to facilitate its fabrication and to reduce heat transfer by these three methods, while retaining a structure which is shock resistant and strong. For example, the outer peripheral side wall 28, made up of the interfitting sleeves 14 and 20, are both made of a low thermal conducting high strength metal such as inconel, stainless steel and especially stainless steel in the 300 series, whereby the outer side wall hereinafter designated by the reference numeral 28 can be extremely thin while yet having sufficient strength to resist normally expected impact or collapse due to atmospheric pressure when the space 30 between the inner and outer side walls is evacuated as will be described hereinafter. The use of the metallic inner and outer side walls greatly enhances the shock resistance of the Dewar and gives rise to the opportunity for constructing on a commercial production basis a Dewar to very close dimensional tolerances. As previously indicated, the opportunity for holding such tolerances is very limited in the prior art. The thickness of the outer side wall when made of AISI stainless steel No. 321 may be between about 4 mils thick and about 20 mils thick with a thickness of about 10 mils being preferred. Secondly, the inner wall made up of the sleeve 18 is also made of strong metal having relatively low thermal conductivity and preferably of the same material from which the outer wall 28 is made. However, the inner wall 18 can be even of thinner gauge than the outer wall due to the fact that when the Dewar space 30 is evacuated the evacuation will tend to cause the inner wall 18 to expand rather than collapse and this will tend to stiffen it. Accordingly, the inner wall 18, when made of AISI 321 stainless steel may be between about 1 mil thick and about 10 mils thick with a thickness of about 2 mils being preferred. Further, the ceramic disc 16 is made of a ceramic material having relatively low thermal conductivity as, for example, alumina. Of course, with respect to each of the materials specified, other design criteria must be considered. For example, it is necessary to utilize materials which are relatively compatible and which can be hermetically sealed to one another by satisfactory means to be described hereinafter, whereby to provide a hermetically sealed Dewar from which air can be evacuated in order to reduce heat transfer by radiation.

The window 22 overlooking the solid state device 26 is preferably made of sapphire, although other suitable radiation transmitting windows may be employed. It will be seen that the window 22 is here shown as being circular in configuration and being seated on a shoulder 32 defined by the inward projection of the upper outer sleeve 20 in the vicinity of the window. Since the window 22 and the outer wall 28 form a portion of the walls defining the space 30 which must be evacuated, the joint between these two elements must be a sealed joint adapted to resist gas transfer. In order to accomplish this, the window 22 may be cemented to the shoulder 32 as by an epoxy resin or low temperature glass. However, in the alternative, the window 22 could be metalized along its peripheral edge and lower surface portions and thereafter the window could be sealed to the shoulder 32 by either solder or a high temperature braze as may be desired. The joint between the upper outer sleeve 20 and the lower outer sleeve 14 is comprised by complimentary offset end portions 34 and 36 which are adapted to interfit or telescope with one another. As shown herein the lower sleeve edge portion 36 fits within the upper sleeve and portion 34. To effect a seal between the two sleeves, again epoxy or low temperature glass may be employed, or in the alternative, solder or high temperature brazing material may be used. Moreover, if desired, and especially with the series 300 stainless steels, a hermetically sealed welded joint may be employed. The choice of material for the ceramic disc 16 is based primarily upon the ability of the material to be hermetically sealed to the stainless steel inner and outer sleeves 18 and 28, on its ability to resist heat transfer by thermal conduction and on its ability to withstand thermal shock. Thus alumina is an excellent material for the disc 16 as the inner and outer surfaces thereof can be mealized as shown at 38 and 40 and after having been so treated the disc 16 can be brazed to the outer sleeve portion 14 and the inner sleeve 18 to form hermetic seals. Moreover, alumina is an extremely desirable material as it can be hermetically sealed to terminal pins extending out through apertures in the aluminum base as will be described hereinafter.

While it is desired that heat transfer from the header 24 to the outside sleeve 28 by conduction be retarded as much as possible by the choice and dimensions of the inner and outer side walls 18 and 30, the heat transfer by conduction to the solid state device 26 carried on the header assembly 24 is preferably very high in order to insure uniformly low temperatures throughout the entire solid state device and to cause the thermal dimension changes of the header and the device to be closely watched. Thus the cap 23 fitted into the upper end of the inner sleeve 18 and connected thereto in a manner to be described hereinafter, is preferably made of a metal having high thermal conductivity such as, for example, copper. The copper cap or head has a downwardly extending cylindrical portion 44 which fits into the inner sleeve 18, this portion 44 having a stepped outer diameter whereby to provide an abutment 46 for the upper end of the sleeve 18. The horizontal portion 48 of the cap 23 is preferably of susbtantial thickness and is flared out as at 50 and has an upwardly extending portion 52 to provide a seat for the disc-like header 24 to be described hereinafter as well as for a reticle and/or a filter or the like. The flared out portion 50 of the cap 23 is provided with four cut-outs arranged in two perpendicularly oriented pairs. The cut-offs in one pair, herein designated by the reference numeral 54, are adapted to receive the ears 56 on the header 24 as will be described hereinafter, and the other pair of cut-outs 57 are provided to permit the use of holding straps 59 which are connected to the cap and overlie the header for holding the header in position as will be more specifically described as this description proceeds.

The header 24 is essentially a circular disc of good thermal conducting material such as, for example, molybdenum and preferably gold plated molybdenum, and having two circular ears extending outwardly therefrom preferably along a common diameter. The ears have been designated by the reference numeral 56. Centrally of each of the ears 56 is a feed-through conductor 58 which is sealed by glass 60 to a Kovar bushing 62 that is soldered or welded to the wall of the apertures 64 in each of the ears. The header assembly 24 carries on its upper planar surface the solid state device 26 which solid state device may be connected to the upper surface of the header 24 by any of a number of conventional techniques such as by the use of solder or the like. The upper ends of the feed-throughs 58 may be connected to fine electric wires 63 and 65 and extend to the terminals of the solid state device 26. With this form of header construction the solid state device can be mounted on the header and connected to the feed-through terminals 58 thereof completely outside of the Dewar whereby to permit comprehensive testing prior to the inclusion of the device 26 in the Dewar assembly. Thereafter, the header with the solid state device affixed thereto can be placed on the upper surface of the cap with the ears 56 passing through the cut-outs 54 in the upper sidewall of the cap 23 to thereby index the solid state device. The cap 23 has welded thereto two holding straps 59 which pass through the cut-outs 57 in the upper side wall 52 of the cap and which have an inwardly bent upper portion 59A which overlies the upper surface of the header 24 along the marginal portion thereof which is not covered by the solid state device 26. Thus the straps hold the header to the cap surface 48. Accordingly, the subsequent inclusion of the header assembly into the Dewar after testing is readily effected.

As previously indicated, the ceramic disc 16 in the base 12 has a plurality of terminal pins extending therethrough. Specifically, there are two terminal pins 66 and 68 which pass through apertures in the ceramic disc and are sealed thereto by conventional hermetic sealing techniques. In addition, two other pins 70 and 72 are provided which other pins extend through the disc 16 in sealed relation therewith and are connected to one another by a barium or other rare earth type getter 74. Also passing through the ceramic disc is a copper tube 76 to provide access to the interior of space 30 for pumping apparatus in order to evacuate the space. Connected to the upper end of the terminals 66 and 68 are fine wires 78 and 80 which are preferably insulated and which wires at their upper ends are connected to the bottoms of the feed-throughs 58 which pass through the ears of the header 24 and have connected at their upper end to wires 63 and 65 which extend to the solid state device 26. Preferably, throughout the major portion of the extent of the wires 78 and 80, the wires are in adhering relation to the side wall of the inner sleeve 18 whereby to increase the ruggedness of the device and to decrease the possibility of vibration inducing spurious signals. In lieu of adhering wires to the outer surface of the inner tube as above described, metallic conductors may be vapor deposited on the outer surface of the inner tube. Specifically, the outer surface of the inner tube can be coated with an insulating coating such as silicon monoxide as by vapor deposition and, after such insulating coating has been placed on the surface, two or more conducting strips, such as noble metal strips, may be vapor deposited over the silicon monoxide coating to serve in lieu of the wires 78 and 80. Naturally, the entire surface of the inner tube need not be coated with silicon monoxide and such insulating coating may be restricted to that surface portion underlying the noble metal strips. In addition, to protect the noble metal strips once vapor deposited, a second layer of silicon monoxide may be deposited over the noble metal conductors. Assuming that only two leads are required for the device 26 then the circuit may be traced from the feed-through 66, the wire 78, its corresponding upper feed-through 58, the wire 63 connected from the upper portion of said feed-through to the solid state device, the solid state device 26, wire 65, the other feed-through 58 in the header 24, thence to the wire 80 and thence to the feed-through 68. However, if there are two solid state devices mounted on the header 24, or if the device 26 requires three terminals, then the Dewar metal assembly itself can serve as a third conductor by making it the ground conductor and particularly by making the inner sleeve 18 a grounded conductor whereby the terminals 66 and 68 may both be connected as "hot" lines. Additional "hot" leads may be provided by adding additional terminals.

In assembling the Dewar 10, the base is assembled by first connecting to the disc 16 the terminals 66, 68, 70 and 72 and sealing said terminals by conventional hermetic sealing techniques. Thereafter the disc 16 may be hermetically sealed to the bottoms of outer sleeve portion 14 and inner sleeve 18 thereby to complete the assembly of the base. Thereafter, the barium or other suitable getter can be connected across the terminals 70 and 72. The cap 23 is inserted into the upper end of the inner sleeve 18 and sealed thereto in any suitable fashion heretofore described.

As a separate assembly, the header 24 and the solid state device 26 may be fabricated. Thus, the header 24 may be stamped from molybdenum or other suitable material and the feed-through electrodes may be separately assembled and then disposed within the apertures 64 in the ears 56 of the header 24. The solid state device may then be disposed over the upper planar surface of the header and sealed thereto as previously described. The conductors running from the upper ends of the feed-throughs 58 to the solid state device may then be connected or deposited, depending upon the manner of fabrication, and thereafter the solid state device so mounted on the header can be put through a series of tests in separate apparatus to determine whether it is functioning properly. After it has been determined that the device is functioning properly the header may be placed into the well which is defined by the upper surface portion 48 and the upwardly extending flange 52, of the cap 23, and the holding straps 59 can be disposed within the slots 57 in the upper flange 52 of the cap and connected to the cap to thereby hold the header and hence the solid state device in illustrated position. Thereafter, the wires 78 and 80, which have been fixed in adhering relation to the outer surface of the inner sleeve 18 may be connected to the bottoms of the feed-throughs 58 and, if they have not already been connected to the tops of the feed-throughs 66 and 68 they may be also connected thereto as by soldering.

In a separate assembly operation, the window 22 may be disposed within the seat defined by the shoulder 32 on the upper sleeve portion 20 and sealed thereto as by epoxy or by metallizing and then soldering or brazing as has been previously described. After such sub-assembly operation the upper sleeve portion 20 may be brought into interfitting relation with the lower sleeve portion 14 with the outer and inwardly offset portions 34 and 36 telescoping and this joint may be sealed as by epoxy resin, solder, brazing or welding.

Assuming all of the joints are properly sealed the space 30 may now be evacuated by utilization of conventional evacuating means connected to tube 76 which passes through the ceramic wafer 16 as previously described. The evacuation continues until a high quality vacuum is achieved within the space 30 whereupon the tube 76 is pinched closed and due to cold flow will make a hermetic seal to prevent air from entering through the tube into the space 30. Of course, other means of closing off tube 76 may be employed. Subsequent to the sealing off of the evacuated chamber 30 power will be connected to the terminals 70 and 72 which are in series relation with the barium getter 74 to cause the getter to heat up and react with any remaining moisture and gaseous materials within the chamber. In this manner the Dewar is constructed.

It will be seen that due to the utilization of materials such as stainless steel, there will be good reflectivity on the side walls of the Dewar whereby to reduce heat transfer by radiation. However, if a material is employed to make said side walls which does not have as good reflectivity as stainless steel, reflective coatings may be placed on both inner and outer surfaces of the inner and outer sleeves 18 and 28 in order to increase reflection and, hence, reduce heat transmission by radiation.

Figures 5, 6, 7, 8, 9:
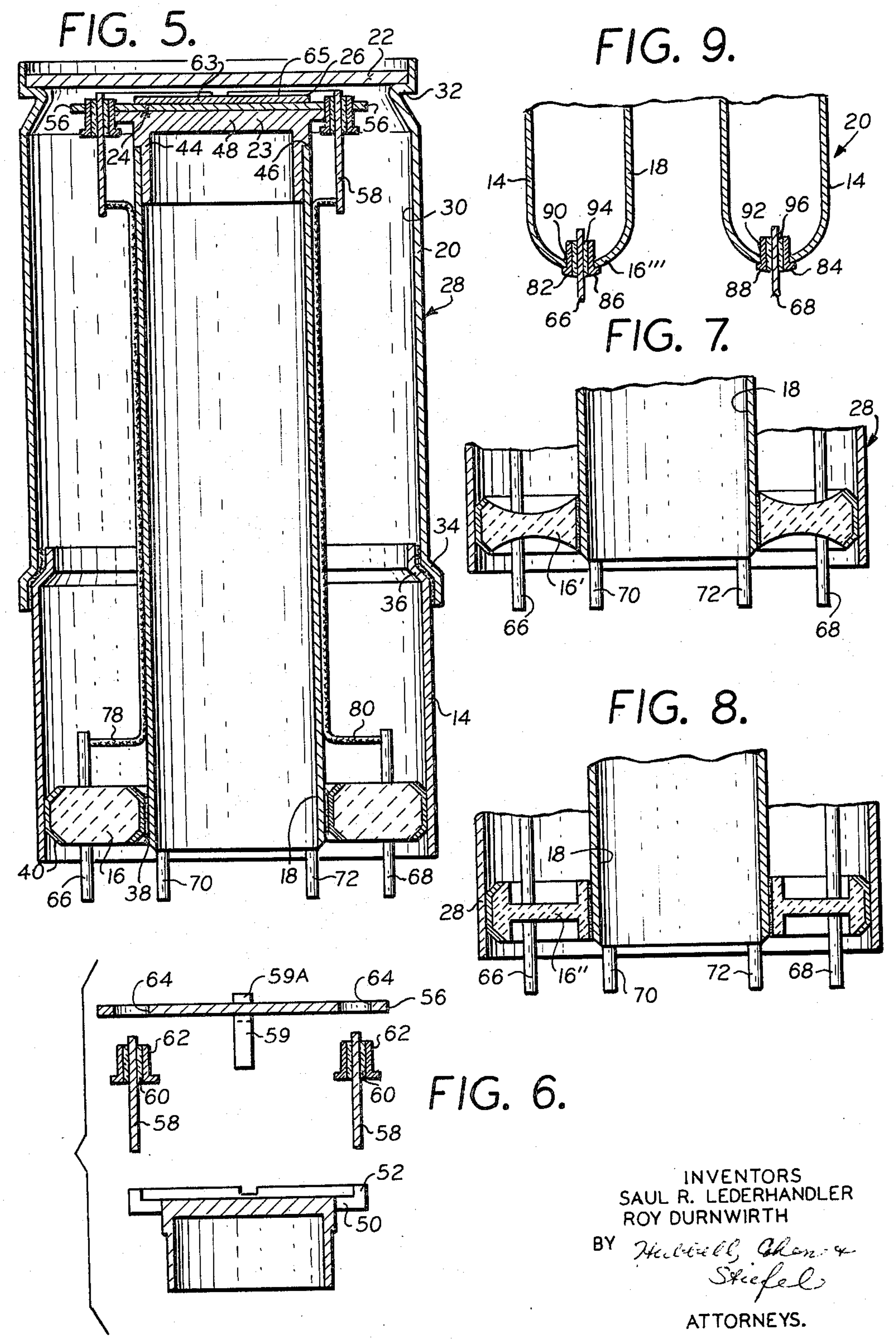
FIG. 5 is a vertical sectional view taken along the line 5—5 in FIG. 2.
FIG. 6 is a vertical sectional view of the top of the inner wall of the Dewar together with portions of the header or device support prior to assembly thereof.
FIG. 7 is a fragmentary vertical sectional view showing a modified form of base for the Dewar.
FIG. 8 is a view similar to FIG. 7 showing still another modification.
FIG. 9 is a view similar to FIG. 7 showing yet a further modification.

In FIGS. 7 and 8, modifications of the base are shown wherein provision is made to reduce heat transfer from the outer sleeve 28 to the inner sleeve 18 through the ceramic insulating disc in the base 12. Thus in FIG. 7 the ceramic insulating disc 16' is shown to have been hollowed out in the center of the ring portion so that the cross-section is sharply reduced in order to cut down heat transfer. In FIG. 8, the annular ceramic disc 16" is shown to have a modified H cross-section whereby to give a very thin central portion that will sharply reduce heat transfer from the outer sleeve 28 to the inner sleeve 18. Aside from these modifications, the structures shown in FIGS. 7 and 8 are exactly the same as those shown in FIGS. 1 to 6.

Referring now to FIG. 9, a modification is shown wherein the ceramic disc 16 of FIG. 5 is eliminated and in lieu thereof the inner wall is formed integrally with the lower outer sleeve 14 of the outer wall 28 as by deep drawing. The terminals 66 and 68 of the modified Dewar shown in FIG. 9 pass through the bite 16''' of the U-shaped bottom of the integrally formed inner and outer walls. As shown, the two terminals 66 and 68 are portions of feed-through conductors 82 and 84, respectively, having outer sleeves 86 and 88 in hermetically sealed relation with the walls of apertures 90 and 92, respectively, in the portion 16''' connecting the inner and outer walls, with a suitable insulating spacer material 94 and 96 mechanically connecting and sealing the outer sleeves 86 and 88 to their respective conductors 66 and 68. A similar construction may be employed for the conductors 70 and 72 which are not shown in FIG. 9 but which may be included. Also, a copper tube 76 may be welded or soldered or similarly sealingly connected to the portion 16''' to facilitate evacuation of the Dewar.

The modified construction shown in FIG. 9 will function susbtantially the same as those shown in FIGS. 5, 7 and 8 but may be some advantages thereover in the ease of production and in the ability of the Dewar to withstand mechanical and thermal shock.

It will be recognized that by utilizing the fabricating techniques to form a Dewar structure in accordance with the foregoing description, a Dewar is achieved that will be extremely rugged as compared with previously employed glass Dewars. Moreover, the Dewars described hereinbefore have extremely low heat transfer characteristics whereby when liquid cryogenic material such as liquid nitrogen or liquid helium is disposed within the inner sleeve 18 to cool the solid state device 26, it will remain for extended periods of time before it finally boils off. Moreover, the heat transfer is sufficiently low that in our experience the window 22 has never been cooled sufficiently to cause frosting which, with respect to many applications, would be extremely undesirable. Thus, a highly effective rugged Dewar for solid state devices is achieved.

While we have herein shown and described the preferred embodiment of the present invention, and have suggested various modifications therein, other changes and modifications may be made therein within the scope of the appended claims without departing from the spirit and scope of this invention.

What we claim is:

1. A Dewar for a solid state device, comprising inner and outer spaced apart thin walls made of metal having low thermal conductivity, an annular ceramic disc connected to said inner and outer walls adjacent one end thereof in sealed relation thereto, said annular disc being made of ceramic having low thermal conductivity, a cap overlying the other end of said inner wall in sealed relation therewith, said cap being made of metal having high thermal conductivity, a radiation transparent window carried by the other end of said outer wall in sealed relation therewith, the space between said inner and outer wall being substantially evacuated 2. A Dewar as defined in claim 1, further comprising a solid state device, a header made of metal having high thermal conductivity, said solid state device being mounted on said header, and a pair of metal straps fixed to said cap and overlying portions of said header for connecting said header to said cap.

3. A Dewar as defined in claim 2, further comprising a pair of feed-through terminals on said header, conductor means connected to said feed-through terminals and to said solid state device, a second pair of feed-through terminals extending through said annular ceramic disc in sealed relation therewith, and a pair of conductors disposed within said evacuated space, each conductor being connected to one of each pair of feed-through terminals and being mechanically fixed to said inner wall of said Dewar.

4. A Dewar as defined in claim 3, wherein said pair of conductors are in adhering relation with said inner wall of said Dewar throughout a major portion of their extent.

5. A Dewar for a solid state device, comprising inner and outer spaced apart thin stainless steel walls, an annular disc of high density alumina connected to said inner and outer walls adjacent one end thereof in sealed relation thereto, a copper cap overlying the other end of said inner wall in sealed relation therewith, a sapphire window carried by the other end of said outer wall in sealed relation therewith, the space between said inner and outer wall being substantially evacuated.

6. A Dewar as defined in claim 5, wherein said outer wall comprises a pair of interfitted sections in sealed relation with one another.

7. A Dewar as defined in claim 5, wherein said inner wall has a thickness between about 1 mil and about 10 mils, and said outer wall has a thickness between about 4 mils and about 20 mils.

8. A Dewar as defined in claim 5, wherein said annular disc has relatively thick portions adjacent both walls and a relatively thin portion therebetween.

9. A Dewar as defined in claim 5, further comprising a solid state device, a molybdenum header, said solid state device being mounted on said header, and a pair of metal straps fixed to said cap and overlying portions of said header for connecting said header to said cap.

10. A Dewar as defined in claim 9, further comprising a pair of feed-through terminals on said header, conductor means connected to said feed-through terminals and to said solid state device, a second pair of feed-through terminals extending through said annular ceramic disc in sealed relation therewith, and a pair of conductors disposed within said evacuated space, each conductor being connected to one of each pair of feed-through terminals and being in adhering relation with said inner wall of said Dewar throughout a major portion of their extent.

11. A Dewar for a solid state device, comprising inner and outer spaced apart thin walls made of metal having low thermal conductivity, means of low thermal conductivity connecting said inner and outer walls adjacent one end thereof in sealed relation thereto, a cap overlying the other end of said inner wall in sealed relation therewith, said cap being made of metal having high thermal conductivity, a radiation transparent window carried by the other end of said outer wall in sealed relation therewith, the space between said inner and outer wall being substantially evacuated.

12. A Dewar as defined in claim 11, wherein said connecting means is made of metal.

13. A Dewar as defined in claim 11, wherein the inner and outer walls are integrally connected adjacent said one end, and further comprising a pair of feed-through terminals secured to said Dewar in the area of said integral connection of said inner and outer walls.

References Cited by the Examiner

UNITED STATES PATENTS

| | | | |
|---|---|---|---|
| 2,892,250 | 6/1959 | Bartels | 338—18 X |
| 2,951,944 | 9/1960 | Fong | 250—83.3 |
| 2,987,686 | 6/1961 | McQuistan | 338—18 |
| 3,006,157 | 10/1961 | Haettinger et al. | 62—269 |
| 3,034,010 | 5/1962 | Garbuny | 313—101 |
| 3,052,861 | 9/1962 | Hayball et al. | 338—18 |
| 3,080,542 | 3/1963 | Long | 338—18 |
| 3,103,585 | 9/1963 | Johnson et al. | 250—83.3 |
| 3,139,599 | 6/1964 | Mesecke | 338—18 |
| 3,180,989 | 4/1965 | Hand et al. | 250—83.3 |
| 3,185,842 | 5/1965 | Johnson | 250—83.3 X |

RICHARD M. WOOD, *Primary Examiner.*

H. T. POWELL, W. D. BROOKS, *Assistant Examiners.*